US009411570B2

(12) United States Patent
   DeHaan

(10) Patent No.: US 9,411,570 B2
(45) Date of Patent: Aug. 9, 2016

(54) INTEGRATING SOFTWARE PROVISIONING AND CONFIGURATION MANAGEMENT

(75) Inventor: Michael Paul DeHaan, Morrisville, NC (US)

(73) Assignee: Red Hat, Inc., Raleigh, NC (US)

(*) Notice: Subject to any disclaimer, the term of this patent is extended or adjusted under 35 U.S.C. 154(b) by 737 days.

(21) Appl. No.: 12/395,379

(22) Filed: Feb. 27, 2009

(65) Prior Publication Data

US 2010/0223367 A1   Sep. 2, 2010

(51) Int. Cl.
   *G06F 15/177* (2006.01)
   *G06F 9/445* (2006.01)

(52) U.S. Cl.
   CPC .................................. *G06F 8/61* (2013.01)

(58) Field of Classification Search
   CPC .... G06F 8/61; G06F 9/44505; H04L 41/0806
   USPC ............... 709/220, 221, 222; 717/176, 177
   See application file for complete search history.

(56) References Cited

U.S. PATENT DOCUMENTS

| | | | |
|---|---|---|---|
| 5,787,246 A | 7/1998 | Lichtman et al. | |
| 5,835,719 A | 11/1998 | Gibson et al. | |
| 5,948,062 A | 9/1999 | Tzelnic et al. | |
| 6,105,100 A | 8/2000 | Dean et al. | |
| 6,212,585 B1 | 4/2001 | Chrabaszcz | |
| 6,243,747 B1 * | 6/2001 | Lewis et al. | 709/220 |
| 6,272,536 B1 | 8/2001 | van Hoff et al. | |
| 6,381,742 B2 | 4/2002 | Forbes et al. | |
| 6,415,289 B1 | 7/2002 | Williams et al. | |
| 6,415,323 B1 * | 7/2002 | McCanne | H04L 12/18 709/224 |
| 6,438,711 B2 | 8/2002 | Woodruff | |
| 6,516,427 B1 | 2/2003 | Keyes et al. | |
| 6,526,442 B1 | 2/2003 | Stupek et al. | |
| 6,550,021 B1 | 4/2003 | Dalphy et al. | |
| 6,557,169 B1 | 4/2003 | Erpeldinger | |
| 6,594,664 B1 | 7/2003 | Estrada et al. | |
| 6,625,742 B1 | 9/2003 | Owhadi et al. | |
| 6,686,838 B1 | 2/2004 | Rezvani et al. | |
| 6,748,436 B1 * | 6/2004 | Anand et al. | 709/226 |
| 6,751,659 B1 | 6/2004 | Fenger et al. | |
| 6,757,837 B1 | 6/2004 | Platt et al. | |
| 6,769,022 B1 | 7/2004 | DeKoning et al. | |
| 6,779,004 B1 | 8/2004 | Zintel | |

(Continued)

OTHER PUBLICATIONS

Processor. (2008). In Dictionary of computing. Retrieved from <URL: http://search.credoreference.com/content/entry/acbcomp/processor/0>.*

(Continued)

*Primary Examiner* — Abdullahi E Salad
*Assistant Examiner* — Wing Ma
(74) *Attorney, Agent, or Firm* — Lowenstein Sandler LLP

(57) ABSTRACT

A provisioning server can cooperate with configuration management systems to deliver provisioning processes integrated with configuration management services. The provisioning server can associate provisioning objects for the various provisioning processes with management classes supported by the configuration management systems. The management classes can include data for configuring the resources of a target machine (hardware, software, data, etc.). As the provisioning server performs the provisioning process for a particular provisioning object on a target machine, the provisioning server can apply the management class, associated with the particular provisioning object, to the target machine.

15 Claims, 4 Drawing Sheets

(56) References Cited

U.S. PATENT DOCUMENTS

| | | |
|---|---|---|
| 6,845,464 B2 | 1/2005 | Gold |
| 6,865,737 B1* | 3/2005 | Lucas et al. ............... 717/178 |
| 6,947,939 B2 | 9/2005 | Fujibayashi et al. |
| 6,986,033 B2 | 1/2006 | Miyamoto et al. |
| 7,013,461 B2* | 3/2006 | Hellerstein et al. ........... 717/177 |
| 7,051,101 B1 | 5/2006 | Dubrovsky et al. |
| 7,107,330 B1 | 9/2006 | Hamilton et al. |
| 7,133,822 B1 | 11/2006 | Jacobson |
| 7,165,109 B2 | 1/2007 | Chiloyan et al. |
| 7,185,071 B2 | 2/2007 | Berg et al. |
| 7,200,845 B2 | 4/2007 | Morrison et al. |
| 7,340,637 B2 | 3/2008 | Nagoya |
| 7,350,112 B2 | 3/2008 | Fox et al. |
| 7,356,679 B1 | 4/2008 | Le et al. |
| 7,395,322 B2* | 7/2008 | Harvey et al. ............... 709/220 |
| 7,506,040 B1 | 3/2009 | Rabe et al. |
| 7,506,151 B2 | 3/2009 | Miyamoto et al. |
| 7,516,218 B2 | 4/2009 | Besson |
| 7,519,691 B2 | 4/2009 | Nichols et al. |
| 7,567,984 B1* | 7/2009 | Todd |
| 7,574,481 B2 | 8/2009 | Moore et al. |
| 7,600,005 B2 | 10/2009 | Jamkhedkar et al. |
| 7,606,868 B1 | 10/2009 | Le et al. |
| 7,640,325 B1 | 12/2009 | DeKoning et al. |
| 7,681,080 B2 | 3/2010 | Abali et al. |
| 7,716,316 B2 | 5/2010 | Nichols et al. |
| 7,734,717 B2 | 6/2010 | Saarimaki et al. |
| 7,827,261 B1 | 11/2010 | Griswold et al. |
| 7,831,997 B2 | 11/2010 | Eldar et al. |
| 7,937,437 B2 | 5/2011 | Fujii |
| 8,266,616 B1* | 9/2012 | Jacquot et al. ............... 717/177 |
| 2002/0062259 A1 | 5/2002 | Katz et al. |
| 2002/0078186 A1 | 6/2002 | Engel et al. |
| 2002/0138567 A1 | 9/2002 | Ogawa |
| 2002/0162028 A1 | 10/2002 | Kennedy |
| 2003/0005097 A1 | 1/2003 | Barnard et al. |
| 2003/0055919 A1 | 3/2003 | Fong et al. |
| 2003/0069884 A1 | 4/2003 | Nair et al. |
| 2003/0069946 A1 | 4/2003 | Nair et al. |
| 2003/0070110 A1 | 4/2003 | Aija et al. |
| 2003/0074549 A1 | 4/2003 | Paul et al. |
| 2003/0110173 A1 | 6/2003 | Marsland |
| 2003/0119480 A1 | 6/2003 | Mohammad |
| 2003/0126585 A1 | 7/2003 | Parry |
| 2003/0195921 A1 | 10/2003 | Becker et al. |
| 2003/0212992 A1 | 11/2003 | Ronning et al. |
| 2004/0006616 A1 | 1/2004 | Quinn et al. |
| 2004/0015831 A1 | 1/2004 | Bowhill |
| 2004/0015957 A1* | 1/2004 | Zara et al. ............... 717/174 |
| 2004/0019876 A1 | 1/2004 | Dravida et al. |
| 2004/0024984 A1 | 2/2004 | Lanzatella et al. |
| 2004/0044643 A1 | 3/2004 | deVries et al. |
| 2004/0054789 A1 | 3/2004 | Breh et al. |
| 2004/0059703 A1 | 3/2004 | Chappell et al. |
| 2004/0064501 A1 | 4/2004 | Jan et al. |
| 2004/0088698 A1* | 5/2004 | Claiborne ............... 717/174 |
| 2004/0128375 A1 | 7/2004 | Rockwell |
| 2004/0143664 A1 | 7/2004 | Usa et al. |
| 2004/0167975 A1 | 8/2004 | Hwang et al. |
| 2004/0215755 A1 | 10/2004 | O'Neill |
| 2004/0223469 A1 | 11/2004 | Bahl et al. |
| 2005/0028025 A1 | 2/2005 | Zalewski et al. |
| 2005/0050175 A1* | 3/2005 | Fong et al. ............... 709/220 |
| 2005/0114474 A1 | 5/2005 | Anderson et al. |
| 2005/0125525 A1 | 6/2005 | Zhou et al. |
| 2005/0177829 A1 | 8/2005 | Vishwanath |
| 2005/0182796 A1 | 8/2005 | Chu et al. |
| 2005/0198629 A1 | 9/2005 | Vishwanath |
| 2005/0223374 A1 | 10/2005 | Wishart et al. |
| 2006/0004766 A1* | 1/2006 | Merkin ............... 707/10 |
| 2006/0041767 A1 | 2/2006 | Maxwell et al. |
| 2006/0080659 A1 | 4/2006 | Ganji |
| 2006/0095230 A1 | 5/2006 | Grier et al. |
| 2006/0095702 A1 | 5/2006 | Hickman et al. |
| 2006/0155857 A1 | 7/2006 | Feenan et al. |
| 2006/0155891 A1* | 7/2006 | Wu ............... 710/10 |
| 2006/0173912 A1 | 8/2006 | Lindvall et al. |
| 2006/0174018 A1 | 8/2006 | Zhu et al. |
| 2006/0190575 A1 | 8/2006 | Harvey et al. |
| 2006/0190773 A1 | 8/2006 | Rao et al. |
| 2006/0200658 A1 | 9/2006 | Penkethman |
| 2006/0215575 A1 | 9/2006 | Horton et al. |
| 2006/0218544 A1 | 9/2006 | Chakraborty et al. |
| 2006/0230165 A1 | 10/2006 | Zimmer et al. |
| 2006/0282479 A1 | 12/2006 | Johnson et al. |
| 2006/0282480 A1* | 12/2006 | Johnson ............... G06F 8/71 |
| 2006/0288055 A1* | 12/2006 | Johnson ............... G06F 8/71 |
| 2007/0015538 A1 | 1/2007 | Wang |
| 2007/0067419 A1 | 3/2007 | Bennett |
| 2007/0101118 A1 | 5/2007 | Raghunath et al. |
| 2007/0118654 A1* | 5/2007 | Jamkhedkar et al. ......... 709/226 |
| 2007/0168721 A1 | 7/2007 | Luiro et al. |
| 2007/0169093 A1 | 7/2007 | Logan et al. |
| 2007/0192158 A1 | 8/2007 | Kim |
| 2007/0204338 A1 | 8/2007 | Aiello et al. |
| 2007/0226810 A1 | 9/2007 | Hotti |
| 2007/0244996 A1 | 10/2007 | Ahmed et al. |
| 2007/0258388 A1* | 11/2007 | Bose ............... 370/254 |
| 2007/0276905 A1 | 11/2007 | Durand et al. |
| 2007/0288612 A1 | 12/2007 | Hall |
| 2007/0294376 A1 | 12/2007 | Ayachitula et al. |
| 2007/0299951 A1 | 12/2007 | Krithivas |
| 2008/0028048 A1 | 1/2008 | Shekar et al. |
| 2008/0040452 A1 | 2/2008 | Rao et al. |
| 2008/0046708 A1 | 2/2008 | Fitzgerald et al. |
| 2008/0059959 A1 | 3/2008 | Chen et al. |
| 2008/0130639 A1 | 6/2008 | Costa-Requena et al. |
| 2008/0189693 A1 | 8/2008 | Pathak |
| 2008/0196043 A1 | 8/2008 | Feinleib et al. |
| 2008/0228902 A1* | 9/2008 | Pichetti et al. ............... 709/220 |
| 2008/0235266 A1 | 9/2008 | Huang et al. |
| 2008/0235361 A1 | 9/2008 | Crosbie et al. |
| 2008/0244325 A1 | 10/2008 | Tyulenev |
| 2008/0256531 A1* | 10/2008 | Gao et al. ............... 717/177 |
| 2008/0270674 A1 | 10/2008 | Ginzton |
| 2008/0288938 A1* | 11/2008 | DeHaan ............... G06F 8/61  717/177 |
| 2008/0294777 A1 | 11/2008 | Karve et al. |
| 2008/0301666 A1 | 12/2008 | Gordon et al. |
| 2008/0313716 A1 | 12/2008 | Park |
| 2008/0320110 A1 | 12/2008 | Pathak |
| 2008/0320472 A1* | 12/2008 | Laska ............... G06F 11/3664  717/178 |
| 2008/0320473 A1* | 12/2008 | Laska ............... G06F 8/60  717/178 |
| 2009/0007091 A1 | 1/2009 | Appiah et al. |
| 2009/0031008 A1* | 1/2009 | Elliott et al. ............... 709/220 |
| 2009/0055901 A1 | 2/2009 | Kumar et al. |
| 2009/0064132 A1 | 3/2009 | Suchy et al. |
| 2009/0089567 A1 | 4/2009 | Boland et al. |
| 2009/0089852 A1 | 4/2009 | Randolph et al. |
| 2009/0106291 A1 | 4/2009 | Ku et al. |
| 2009/0129597 A1 | 5/2009 | Zimmer et al. |
| 2009/0132682 A1 | 5/2009 | Counterman |
| 2009/0132710 A1 | 5/2009 | Pelley |
| 2009/0158148 A1 | 6/2009 | Vellanki et al. |
| 2009/0158272 A1* | 6/2009 | El-Assir et al. ............... 717/177 |
| 2009/0164522 A1 | 6/2009 | Fahey |
| 2009/0165099 A1 | 6/2009 | Eldar et al. |
| 2009/0172430 A1 | 7/2009 | Takenouchi |
| 2009/0240835 A1 | 9/2009 | Adelman et al. |
| 2009/0249488 A1* | 10/2009 | Robinson et al. ............... 726/26 |
| 2009/0259665 A1 | 10/2009 | Howe et al. |
| 2009/0265707 A1 | 10/2009 | Goodman et al. |
| 2009/0282404 A1 | 11/2009 | Khandekar et al. |
| 2009/0285199 A1 | 11/2009 | Strahs et al. |
| 2009/0300609 A1* | 12/2009 | Hicks ............... G06F 8/61  718/1 |
| 2009/0300610 A1* | 12/2009 | Hicks ............... G06F 8/61  718/1 |
| 2009/0300619 A1* | 12/2009 | Hicks ............... G06F 8/63  718/100 |
| 2010/0023740 A1 | 1/2010 | Moon et al. |
| 2010/0100876 A1 | 4/2010 | Glover et al. |

(56) References Cited

U.S. PATENT DOCUMENTS

| | | |
|---|---|---|
| 2010/0217837 A1 | 8/2010 | Ansari et al. |
| 2010/0220584 A1 | 9/2010 | DeHaan et al. |
| 2010/0223504 A1 | 9/2010 | DeHaan et al. |
| 2010/0223608 A1 | 9/2010 | DeHaan et al. |
| 2010/0223609 A1 | 9/2010 | DeHaan et al. |

OTHER PUBLICATIONS

Aguirre et al., "IBM WorkSpace On-Demand 3.0.1," IBM Redbooks, Nov. 2000, SG24-6006-00, pp. 5-7 [retrieved on Nov. 24, 2015]. Retrieved from the Internet: <URL:http://www.redbooks.ibm.com/redbooks/pdfs/sg246006.pdf>.*
DeHaan, "Systems and Methods for Providing Configuration Management Services from a Provisioning Server", U.S. Appl. No. 12/414,941, filed Mar. 31, 2009.
DeHaan, "Systems and Methods for Retiring Target Machines by a Provisioning Server", U.S. Appl. No. 12/475,427, flied May 29, 2009.
DeHaan, "Methods and Systems for Centrally Managing Multiple Provisioning Servers", U.S. Appl. No. 12/201,193, filed Aug. 29, 2008.
DeHaan, "Methods and Systems for Assigning Provisioning Servers in a Software Provisioning Environment", U.S. Appl. No. 12/201,646, filed Aug. 29, 2008.
DeHaan, "Methods and Systems for Providing Remote Software Provisioning to Machines", U.S. Appl. No. 12/195,633, filed Aug. 21, 2008.
DeHaan, "Systems and Methods for Storage Allocation in Provisioning of Virtual Machines", U.S. Appl. No. 12/202,178, filed Aug. 29, 2008.
DeHaan, "Methods and Systems for Providing Customized Actions Related to Software Provisioning", U.S. Appl. No. 12/200,552, filed Aug. 28, 2008.
DeHaan, "Methods and Systems for Automatically Locating a Provisioning Server", U.S. Appl. No. 12/198,290, filed Aug. 26, 2008.
DeHaan, "Methods and Systems for Managing Access in a Software Provisioning Environment", U.S. Appl. No. 12/201,832, filed Aug. 29, 2008.
DeHaan, "Methods and Systems for Importing Software Distributions in a Software Provisioning Environment", U.S. Appl. No. 12/200,631, filed Aug. 28, 2008.
DeHaan et al., "Methods and Systems for Managing Network Connections Associated with Provisioning Objects in a Software Provisioning Environment", U.S. Appl. No. 12/239,690, filed Sep. 26, 2008.
DeHaan, "Methods and Systems for Monitoring Software Provisioning", U.S. Appl. No. 12/198,378, filed Aug. 26, 2008.
DeHaan, "Systems and Methods for Software Provisioning in Multiple Network Configuration Environment", U.S. Appl. No. 12/202,194, filed Aug. 29, 2008.
DeHaan, "Systems and Methods for Differential Software Provisioning on Virtual Machines Having Different Configurations", U.S. Appl. No. 12/202,019, filed Aug. 29, 2008.
DeHaan, "Methods and Systems for Automatically Registering New Machines in a Software Provisioning Environment", U.S. Appl. No. 12/194,754, filed Aug. 20, 2008.
DeHaan, "Systems and Methods for Software Provisioning Machines Having Virtual Storage Resources", U.S. Appl. No. 12/202,189, filed Aug. 29, 2008.
DeHaan et al., "Methods and Systems for Managing Network Connections in a Software Provisioning Environment", U.S. Appl. No. 12/239,681, filed Sep. 26, 2008.
DeHaan et al., "Methods and Systems for Providing a Rescue Environment in a Software Provisioning Environment", U.S. Appl. No. 12/325,007, filed Nov. 28, 2008.
DeHaan et al., "Systems and Methods for Monitoring Hardware Resource in a Software Provisioning Environment", U.S. Appl. No. 12/325,056, filed Nov. 28, 2008.
DeHaan, "Methods and Systems for Providing Power Management Services in a Software Provisioning Environment", U.S. Appl. No. 12/277,518, filed Nov. 25, 2008.
DeHaan et al., "Methods and Systems for Providing Hardware Updates in a Software Provisioning Environment", U.S. Appl. No. 12/324,991, filed Nov. 28, 2008.
DeHaan et al., "Methods and Systems for Supporting Multiple Name Servers in a Software Provisioning Environment", U.S. Appl. No. 12/324,572, filed Nov. 26, 2008.
DeHaan et al, "Methods and Systems for Secure Gated File Deployment Associated with Provisioning", U.S. Appl. No. 12/393,754, filed Feb. 26, 2009.
DeHaan, "Systems and Methods for Abstracting Software Content Management in a Software Provisioning Environment", U.S. Appl. No. 12/395,273, filed Feb. 27, 2009.
DeHaan et al., "Systems and Methods for Providing a Library of Virtual Images in a Software Provisioning Environment", U.S. Appl. No. 12/395,351, filed Feb. 27, 2009.
DeHaan et al., "Systems and Methods for Inventorying Un-Provisioned Systems in a Software Provisioning Environment", U.S. Appl. No. 12/391,588, filed Feb. 24, 2009.
DeHaan et al, "Systems and Methods for Managing Configurations of Storage Devices in a Software Provisioning Environment", U.S. Appl. No. 12/393,613, filed Feb. 26, 2009.
DeHaan et al., "Systems and Methods for Collecting and Altering Firmware Configurations of Target Machines in a Software Provisioning Environment", U.S. Appl. No. 12/393,319, filed Feb. 26, 2009.
DeHaan et al., "Methods and Systems for Replicating Provisioning Servers in a Software Provisioning Environment", U.S. Appl. No. 12/392,508, filed Feb. 25, 2009.
DeHaan, "Systems and Methods for Cloning Target Machines in a Software Provisioning Environment", U.S. Appl. No. 12/473,014, filed May 27, 2009.
DeHaan, "Methods and Systems for Provisioning Software", U.S. Appl. No. 11/763,315, filed Jun. 14, 2007.
DeHaan, "Methods and Systems for Provisioning Software", U.S. Appl. No. 11/763,333, filed Jun. 14, 2007.
DeHaan, "Systems and Methods for Message-Based Installation Management Using Message Bus", U.S. Appl. No. 12/495,077, filed Jun. 30, 2009.
Henson, "Systems and Methods for Integrating Storage Resources from Storage Area Network in Machine Provisioning Platform", U.S. Appl. No. 12/628,041, filed Nov. 30, 2009.
Henson, "Systems and Methods for Mounting Specified Storage Resources from Storage Area Network in Machine Provisioning Platform", U.S. Appl. No. 12/627,988, filed Nov. 30, 2009.
Doc Searls "Linux for Suits", 2005, Specialized System Consultants Inc., vol. 2005.
eBook "Microsoft System Management Server 2003 Administrator's companion", Microsoft Press, c2004, Ch. 13, Patch Management, pp. 471-607.
Butt et al., "Automated Installation of Large-Scale Linux Networks", 2000.
Agarwalla, "Automating Provisioning of Complete Software Stack in a Grid Environment", 2004.
Anderson et al., "Technologies for Large-Scale Configuration Management", Dec. 9, 2002.
Grosse, "Repository Mirroring", 1995.
HP Storage Essentials SRM 6.0 Installation Guide, Jan. 2008. HP. 1st ed. Part No. T4283-96113. pp. 1-5, 97-136, 219-228.
HP Storage Essentials SRM 6.0 User Guide. Jan. 2008. HP. 1st ed. Part No. T4238-96114. pp. 1-83.
Michael DeHaan, "Unfiled Provisioning", 2007.
Michael DeHaan, "Provisioning With Cobbler". 2007.
Tan et al. "A WBEM Basked Disk Array Management Provider". 2005. IEEE. 2005 International Conference on Cyberworlds.
Lovelace et al. Managing Disk Subsystems using IBM TotalStorage Productivity Center, Sep. 2005, IBM. 2nd ed. SG24-7097-01. pp. 1-42.

* cited by examiner

INTEGRATING SOFTWARE PROVISIONING AND CONFIGURATION MANAGEMENT

FIELD

This invention relates generally to software provisioning. In particular, the invention relates to systems and methods for integrating software provisioning and configuration management.

DESCRIPTION OF THE RELATED ART

Software provisioning is the process of selecting a target machine, such as a server, loading the appropriate software (operating system, device drivers, middleware, and applications), and customizing and configuring the system and the software to make it ready for operation. Software provisioning can entail a variety of tasks, such as creating or changing a boot image, specifying parameters, e.g. IP address, IP gateway, to find associated network and storage resources, and then starting the machine and its newly-loaded software. Typically, a system administrator will perform these tasks using various tools because of the complexity of these tasks. Unfortunately, there is a lack of provisioning control tools that can adequately integrate and automate these tasks.

For a network of computing systems, the network will include, in addition to install servers, other management systems to track the systems and devices of the network. Typically, the install servers and the other management systems are unaware of the processes performed by each. Thus, it can be difficult to maintain consistency in the network because both the install servers and the management system change and alter the computing systems and devices of the network.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
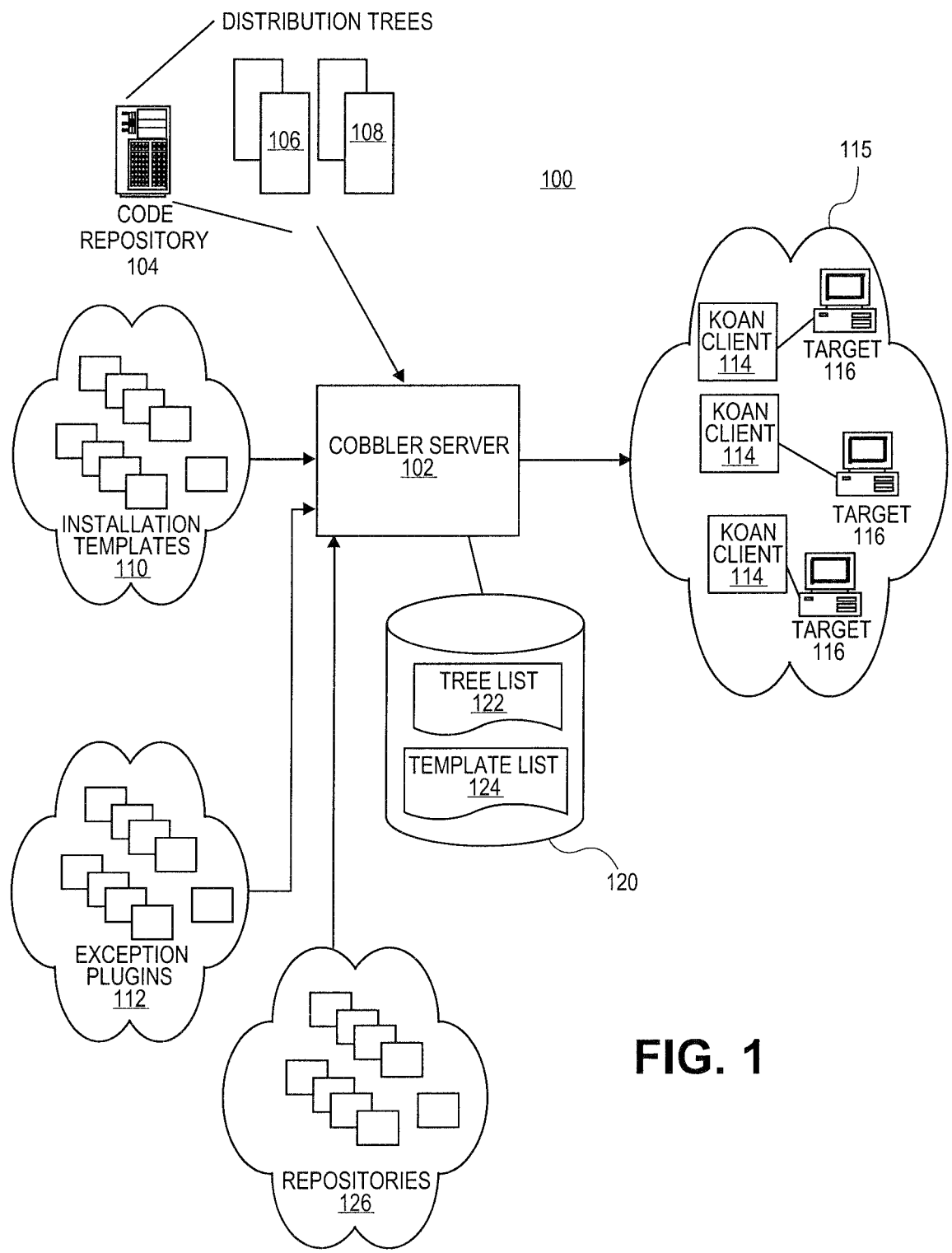
FIG. 1 illustrates an overall provisioning environment in which various embodiments of the present teachings can be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for providing provisioning processes in concert with configuration management in a software provisioning environment. More particularly, a provisioning server can be configured to operate in conjunction with configuration management systems to integrate the provisioning processes and configuration management.

According to embodiments, the provisioning server can be configured to cooperate with configuration management systems to deliver provisioning processes integrated with configuration management services. The provisioning server can be configured to associate provisioning objects for the various provisioning processes with management classes supported by the configuration management systems. The management classes can include data for configuring the resources of a target machine (hardware, software, data, etc.).

In embodiments, as the provisioning server performs the provisioning process for a particular provisioning object on a target machine, the provisioning server can be configured to apply the management class, associated with the particular provisioning object, to the target machine. For example, the provisioning server can apply the configuration data to the target machine as specified in the associated management class. After provisioning, the provisioning server can be configured to provide an indication including the identification of the target machine, the provisioning process performed, and the management class associated with the target machine to the configuration management system associated with the management class.

In embodiments, the provisioning server can be configured to generate the management classes for the configuration management system. Likewise, the provisioning server can be configured to receive the management classes from the configuration management systems. In either case, the provisioning server can be configured to store the generated and/or receive management classes for use during provisioning processes.

By linking provisioning objects with the management classes, the provisioning server can ensure that new target machines in the software provisioning environment are immediately integrated and supported by the appropriate configuration management systems. Additionally, the provisioning server can ensure that changes to existing target machines remain in sync with the configuration management systems. As such, the provisioning server can seamlessly maintain consistency between the provisioning processes and the configuration management services.

FIG. 1 illustrates an overall provisioning environment 100, in systems and methods for the execution, management, and monitoring of software provisioning, according to exemplary aspects of the present disclosure. Embodiments described herein can be implemented in or supported by the exemplary environment illustrated in FIG. 1. The provisioning environment 100 provides a unified provisioning environment, which comprehensively manages the tasks related to software provisioning.

In particular, the provisioning environment 100 can manage software provisioning using a hierarchy of commands. In exemplary embodiments, the hierarchy can include at least four levels of commands. The lowest level in the hierarchy can comprise distribution commands, which primarily handle base operating system specific tasks of provisioning. The second level can comprise profile commands, which associate a configuration file, such as a kickstart file for Linux or other operating system, with a distribution and optionally allow for customization. The third level comprises system commands, which associate remote systems that are involved with the provisioning of the software. The fourth level comprises repository commands, which address configurations and tasks related to updating the software, remote installation procedures, and optionally customizing the software.

The provisioning environment 100 provides several capabilities and advantages over the known provisioning solutions. For example, the present invention is capable of handling a variety of forms of installations, such as preboot execution environment ("PXE"), virtualization, re-installations, and image installations.

In exemplary aspects, the provisioning environment 100 enables integrating virtualization into a PXE provisioning infrastructure and provides several options to reinstall running machines as well. The provisioning environment 100 can integrate mirroring of package repositories with the provisioning process, so that a provisioning server may serve as a central mirror point of contact for all of an organization's software needs. In aspects, a set of remote mirrored repositories can automatically be used by provisioned systems without additional setup.

Reference will now be made in detail to the exemplary aspects the provisioning environment 100. The provisioning environment 100 can be applied to provisioning any form of software, such as Windows systems, UNIX systems, and Linux systems. In the exemplary description that follows, FIG. 1 is presented to explain the provisioning environment 100 for provisioning software, such as Linux, and Linux based software, such as Fedora and Red Hat Enterprise Linux by Red Hat, Inc.

In provisioning of software such as Linux, many system administrators use what is known as the "kickstart" installation method. Kickstart files are files that specify the intended configuration of the software being provisioned. Kickstart files can be kept on a server and can be read by individual computers during the installation. This installation method allows the use of a single or relatively few standard kickstart files to install Linux on multiple machines, making it ideal for network and system administrators.

The kickstart file can be a simple text file, containing a list of items, each identified by a keyword. In general, a kickstart file can be edited with any text editor or word processor that can save files as ASCII text. One skilled in the art will recognize that the present invention may be applied to non-kickstart files in software provisioning. For example, configuration files such as AutoYAST Answer files used in Novell SuSe Linux and Sun Solaris Jumpstart files may also be used by the provisioning environment 100.

Typically, a kickstart file can be copied to the boot disk, or made available on the network. The network-based approach is most commonly used, as most kickstart installations for software provisioning, such as Linux systems, tend to be performed via a network using NFS, FTP, or HTTP on networked computers. Administrators also find it desirable that kickstart installations can be performed using a local CD-ROM, or a local hard drive.

Using kickstart files, a system administrator can create a single file containing the parameters that are needed to complete a typical software installation. For example, kickstart files specify parameters related to: language selection; mouse configuration; keyboard selection; boot loader installation; disk partitioning; network configuration; NIS, LDAP, Kerberos, Hesiod, and Samba authentication; firewall configuration; and package selection.

According to exemplary aspects illustrated in FIG. 1, the provisioning environment 100 can include a provisioning server 102, a code repository 104 which provides access to distributions 106 and 108, a set of installation templates 110, a set of exception plugins 112, a helper client 114 running on target machines 116 in a network 115, a provisioning database 120 which comprises a distribution tree list 122 and template list 124. Each of these components will now be further described.

The provisioning server (from herein referred to as a "cobbler") 102 is responsible for: serving as an extensible markup language remote procedure call (XMLRPC) handler; linking to or mirroring install distribution trees and a configuration database; hosting kickstart templates; hosting plugins; generating installation images, and the like. The cobbler server 102 can be implemented as software, such as Python code, installed on a boot server machine and provide a command line interface for configuration of the boot server. In addition, the cobbler server 102 can make itself available as a Python application programming interface (API) for use by higher level management software (not shown). The cobbler server 102 supports provisioning via PXE, image (ISO) installation, virtualization, re-provisioning. As will be described later, the last two modes are performed with the assistance of a helper client 114.

The code repository 104 is responsible for hosting distributions 106 and 108. The code repository 104 can be implemented using well known components of hardware and software. Additionally, the code repository 104 can include one or more repositories hosting distributions. The distributions 106 and 108 can include bundles of software that are already compiled and configured. The distributions 106 and 108 may be in the form of either rpm, deb, tgz, msi, exe formats, and the like. For example, as Linux distributions, the distributions 106 and 108 are bundles of software that comprise the Linux kernel, the non-kernel parts of the operating system, and assorted other software. The distributions 106 and 108 can take a variety of forms, from fully-featured desktop and server operating systems to minimal environments.

In exemplary aspects, the installation templates 110 are any data structure or processing element that can be combined with a set of installation configurations and processed to produce a resulting configuration file, such as a kickstart file.

In exemplary aspects, exception plugins 112 are software that interact with cobbler server 102 to customize the provisioning of software. In general, the exception plugins 112 are intended to address infrequent customization needs.

In exemplary aspects, the helper client (known as "koan", which stands for "kickstart-over-a-network") 114 can assist the cobbler server 102 during the provisioning processes. The koan 114 can allow for both network provisioning of new virtualized guests and destructive provisioning of any existing system. When invoked, the koan 114 can request profile information from a remote boot server that has been configured with the cobbler server 102. In some aspects, what the koan 114 does with the profile data depends on whether it was invoked with—virt or—replace-self.

In exemplary aspects, the koan 114 can enable replacing running systems as well as installing virtualized profiles. The koan 114 can also be pushed out to systems automatically from the boot server. In some aspects, the koan client 114 is also written in Python code to accommodate a variety of operating systems, machine architectures, etc.

In exemplary aspects, the network 115 can include a number of the target machines 116. The target machines 116 can represent the particular machines to which software provisioning is directed. The target machines 116 can represent a wide variety of computing devices, such as personal computers, servers, laptop computers, personal mobile devices, and the like. In some aspects, the target machines 116 can represent distributed computing environments such as cloud computing environments. Although FIG. 1 shows several of the target machines 116, the provisioning environment 100 can be capable of managing a wide range environments, such as datacenters with thousands of machines or server pools with just a few machines. Additionally, the cobbler server 102 can be connected to multiple networks 115.

In exemplary aspects, the provisioning database 120 can serve as a data storage location for holding data used by the cobbler server 102. For example, as shown, the provisioning database 120 can comprise the distribution tree list 122 and the template list 124. The distribution tree list 122 can provide an inventory of the distributions 106 and 108 that are hosted or mirrored by the cobbler server 102. The template list 124 can provide an inventory of the templates 110 that are hosted by the cobbler server 102.

As noted above, the cobbler server 102 can manage provisioning using a hierarchical concept of distribution commands, profile commands, system commands, and repository commands. This framework enables the cobbler server 102 to abstract the differences between multiple provisioning types (installation, reinstallation, and virtualization) and allows installation of all three from a common platform. This hierarchy of commands also permits the cobbler server 102 to integrate software repositories 126 with the provisioning process, thus allowing systems to be configured as a mirror for software updates and third party content as well as distribution content.

Distributions can contain information about base operating system tasks, such as what kernel and initial ramdisk ("initrd") are used in the provisioning, along with other information, such as required kernel parameters. Profiles associate one of the distributions 106 and 108 with a kickstart file and optionally customize it further, for example, using plugins 112. System commands associate a hostname, IP, or (machine access control) MAC with a distribution and optionally customize the profile further. Repositories contain update information, such as yum mirror information that the cobbler server 102 uses to mirror repository 104. The cobbler server 102 can also manage (generate) dynamic host configuration protocol (DHCP) configuration files using the templates 110.

In exemplary aspects, the cobbler server 102 can use a provisioning environment that is fully templated, allowing for kickstarts and PXE files to be customized by the user. The cobbler server 102 uses the concept of "profiles" as an intermediate step between the operating system and the installed system. A profile is a description of what a system does rather than the software to be installed. For instance, a profile might describe a virtual web server with X amount of RAM, Y amount of disk space, running a Linux distribution Z, and with an answer file W.

In exemplary aspects, the cobbler server 102 can provide a command line interface to configure a boot server in which it is installed. For example, the format of the cobbler server 102 commands can be generally in the format of: cobbler command [subcommand][—arg1=][—arg2=]. Thus, a user can specify various aspects of software provisioning via a single interface, such as a command line interface or other known interface. Examples of exemplary cobbler commands can be found in U.S. patent application Ser. No. 11/763,315, U.S. Patent Application Publication No. 2008-0288938 and U.S. patent application Ser. No. 11/763,333, U.S. Patent Publication No. 2008-0288939, all assigned to Red Hat Corporation, the disclosures of which are incorporated herein, in their entirety, by reference.

According to exemplary aspects, a user can use various commands of the provisioning environment 100 to specify distributions and install trees hosted by the code repository 104, such as a distribution from the distributions 106 or 108. A user can add or import a distribution or import it from installation media or an external network location.

According to exemplary aspects, in order to import a distribution, the cobbler server 102 can auto-add distributions and profiles from remote sources, whether this is an installation media (such as a DVD), an NFS path, or an rsync mirror. When importing an rsync mirror, the cobbler server 102 can try to detect the distribution type and automatically assign kickstarts. By default in some embodiments, the cobbler server can provision by erasing the hard drive, setting up eth0 for DHCP, and using a default password. If this is undesirable, an administrator may edit the kickstart files in /etc/cobbler to do something else or change the kickstart setting after the cobbler server 102 creates the profile.

According to exemplary aspects, a user may map profiles to the distributions and map systems to the profiles using profile commands and systems commands of the provisioning environment 100. A profile associates a distribution to additional specialized options, such as a kickstart automation file. In the cobbler server 102, profiles are the unit of provisioning and at least one profile exists for every distribution to be provisioned. A profile might represent, for instance, a web server or desktop configuration.

According to exemplary aspects, a user can map systems to profiles using system commands. System commands can assign a piece of hardware with cobbler server 102 to a profile. Systems can be defined by hostname, Internet Protocol (IP) address, or machine access control (MAC) address. When available, use of the MAC address to assign systems can be preferred.

According to exemplary aspects, the user can map repositories and profiles using repository commands. Repository commands can address configurations and tasks related to updating the software, remote installation procedures, and optionally customizing the software. These repository commands can also specify mirroring of the provisioned software to remote servers. Repository mirroring can allow the cobbler server 102 to mirror not only the trees 106 and 108, but also optional packages, third party content, and updates. Mirroring can be useful for faster, more up-to-date installations and faster updates, or providing software on restricted networks. The cobbler server 102 can also include other administrative features, such as allowing the user to view their provisioning configuration or information tracking the status of a requested software installation.

According to exemplary aspects, a user can utilize commands to create a provisioning infrastructure from a distribution mirror. Then a default PXE configuration is created, so that by default, systems will PXE boot into a fully automated install process for that distribution. The distribution mirror can be a network rsync mirror or a mounted DVD location.

According to exemplary aspects, the administrator uses a local kernel and initrd file (already downloaded), and shows how profiles would be created using two different kickstarts—one for a web server configuration and one for a database server. Then, a machine can be assigned to each profile.

According to exemplary aspects, a repo mirror can be set up for two repositories, and create a profile that will auto install those repository configurations on provisioned systems using that profile.

According to exemplary aspects, in addition to normal provisioning, the cobbler server 102 can support yet another option, called "enchant". Enchant takes a configuration that has already been defined and applies it to a remote system that might not have the remote helper program installed. Users can use this command to replace a server that is being repurposed, or when no PXE environment can be created. Thus, the enchant option allows the koan client 114 to be executed remotely from the cobbler server 102.

According to aspects, if the cobbler server 102 is configured to mirror certain repositories, the cobbler server 102 can then be used to associate profiles with those repositories. Systems installed under those profiles can be auto configured to use these repository mirrors in commands and, if supported, these repositories can be leveraged. This can be useful for a large install base, when fast installation and upgrades for systems are desired, or software not in a standard repository exists and provisioned systems desire to know about that repository.

According to exemplary aspects, the cobbler server 102 can also keep track of the status of kickstarting machines. For example, the "cobbler status" will show when the cobbler server 102 thinks a machine started kickstarting and when it last requested a file. This can be a desirable way to track machines that may have gone inactive during kickstarts. The cobbler server 102 can also make a special request in the post section of the kickstart to signal when a machine is finished kickstarting.

According to exemplary aspects, for certain commands, the cobbler server 102 will create new virtualized guests on a machine in accordance with orders from the cobbler server 102. Once finished, an administrator can use additional commands on the guest or other operations. The cobbler server 102 can automatically name domains based on their MAC addresses. For re-kickstarting, the cobbler server 102 can reprovision the system, deleting any current data and replacing it with the results of a network install.

According to exemplary aspects, the cobbler server 102 can configure boot methods for the provisioning requested by the user. For example, the cobbler server 102 can configure a PXE environment, such as a network card BIOS. Alternatively, the cobbler server 102 can compile and configure information for koan client 104. The cobbler server 102 can also optionally configure DHCP and DNS configuration information.

According to exemplary aspects, the cobbler server 102 can serve the request of the koan client 114. The koan client 114 can acknowledge the service of information of the cobbler server 102 and can then initiate installation of the software being provisioned. Additionally, the koan client 114 can either install the requested software, e.g., replace the existing operating system, or install a virtual machine.

Figure 2:
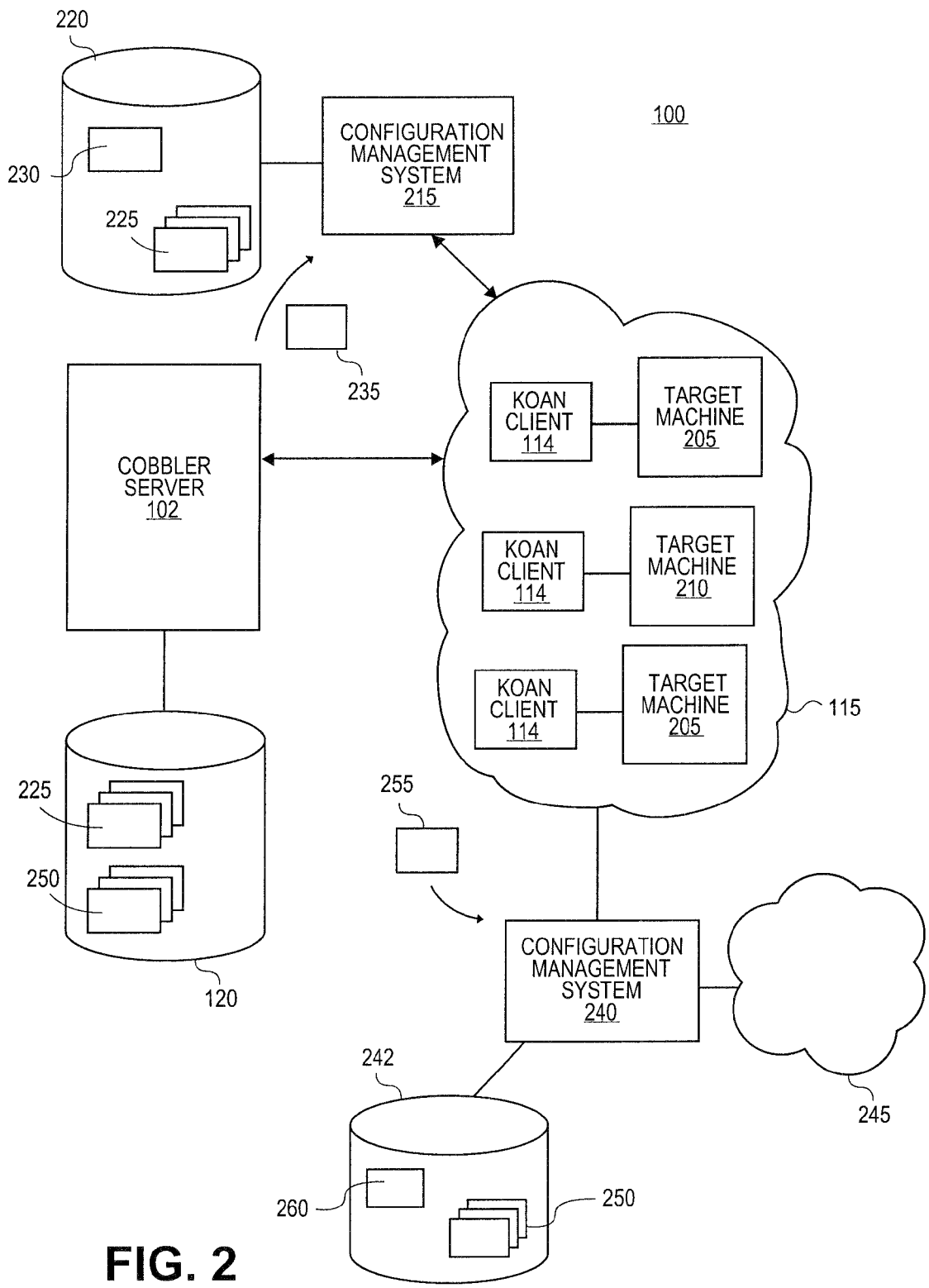
FIG. 2 illustrates the overall provisioning environment in which a provisioning server can cooperate with configuration management systems during provisioning processes, according to various embodiments.

FIG. 2 illustrates aspects of the provisioning environment 100 that allows the provisioning of virtual images, according to embodiments. In embodiments as shown, the cobbler server 102 can be coupled to a network 115 and a provisioning database 120 to provide provisioning processes and other actions related to provisioning to target machines 205 and 210 in the network 115. Additionally, the cobbler server 102 can be configured to communicate with one or more configuration management systems to integrate configuration management services with the software provisioning processes. While FIG. 2 illustrates one network 115 with exemplary components, one skilled in the art will realize that the cobbler server 102 can be coupled to multiple networks to provide provisioning processes and other actions related to provisioning.

As shown in FIG. 2, the network 115 can include a number of target machines 205 and 210. For example, the target machines 205 and 210 can include computing systems such as servers, personal computers, laptop computers, etc. In embodiments, the target machines 205 and 210 can include hardware typically found in conventional computing systems (processors, memory, video cards, network interface cards, storage devices, and the like). One skilled in the art will realize that network 115 can include any number of target machines 205 and 210.

In embodiments, the cobbler server 102 can be configured to provide provisioning processes for software distributions utilizing provisioning objects as described above. In the provisioning processes for software distributions, the cobbler server 102 installs a particular software distribution on a target machine 205 or 210 utilizing the provisioning objects such as profiles, templates, system records including the target machine information, etc., as described above.

In embodiments, the provisioning objects can include all the data required by a cobbler server 102 to perform the software provisioning processes, such as the process described above, supported by the cobbler server 102. For example, the provisioning objects can include software distributions; configuration templates (templates for generating configuration files, such as kickstart files); distribution profile information (mapping a distribution to profile; a configuration template or a configuration file, and additional preferences, such as kernel options, template variables, or virtual machine settings); target machine information (information representing the mapping of a physical piece of hardware, plus hardware specific customizations, to a profile that it should run); repos information (information representing external or internal software repositories stored on the cobbler server); images (such as distributions representing an undefined executable image (like "memtest"); a virtual machine to be cloned, or an ISO file for use in installing a virtual machine); and the like.

In embodiments, a configuration management system 215 can be coupled to the network 115. The configuration management system 215 can be configured to provide configuration management services to the network 115. The configuration management system 215 performs the configuration management services in order to maintain consistency and reliability of the network 115. The configuration management services can include tracking the types and configurations of the target machines 205 and 210 and the types and configurations of the resources of the target machines 205 and 210 (hardware included in the target machines 205 and 210, software installed on the target machines 205 and 210, data maintained by the target machines 205 and 210, and the like). Additionally, the configuration management services can include managing, setting and altering the configurations of the target machines 205 and 210 and the configurations of the resources of the target machines 205 and 210. The configuration management system 215 can be coupled to a configuration management data base (CMDB) 220 for storing information related to the configuration management services.

In embodiments, the configuration management system 215 can be configured as any type of open-source or proprietary configuration management system, protocol and/or tool, and configured to support any type of configuration management services, protocols, or methods. For example, the configuration management 215 can be implemented utilizing known configuration management systems and tools such as Puppet™, cfengine, bcfg2, chef, capistrano, fabric, or spine or any other type of proprietary or open-source systems or tools.

In embodiments, to perform the configuration management services, the configuration management system 215 can be configured to employ a set of management classes 225. A management class can include a description of rules, profiles, data files, or configurations that can be applied to the target machines 205 and 210. For instance, the management class can include rules, profiles, data, files, and/or configurations that make the target machines 205 and 210 perform a particular role or be configured in a certain manner. For example, a particular management class can describe rules, files, and/or configurations necessary to configure a "webserver" once it is installed. The management class can be configured to include rules, files, profiles, and/or configurations that describe other functions and operations of the target machines 205 and 210 such as resource configuration, service configuration, security configuration, and the like.

In embodiments, when a particular target machine is assigned a management class, the configuration management system 215 can be configured to apply the specific configuration of the management class to the particular target machine. When the specific configuration of a management class is altered or updated, the configuration management system 215 can be configured to apply the alteration or update to all target machines associated with the management class. As such, the configuration management system 225 can maintain consistency throughout the network 115. The configuration management system 215 can be configured to maintain the set of management classes 225 in the CMDB 220.

In embodiments, the configuration management system 215 can also be configured to maintain a network record 230. The network record 230 can be configured to include an identification of the target machines 205 and 210, in the network 115, associated with the management class assigned to the target machines 205 and 210. The configuration management system 215 can be configured to maintain the network record 230 in the CMDB 220.

In embodiments, the cobbler server 102 can be configured to cooperate with the configuration management system 215 in order to integrate the configuration management services with the provisioning processes. To achieve this, the cobbler server 102 can be configured to associate the provisioning objects with different management classes in the set of management classes 225. For example, the cobbler server 102 can associate the profiles, templates, system records, etc. with different management classes in the set of management classes 225. Accordingly, when the cobbler server 102 performs provisioning processes on a target machine 205 utilizing a particular provisioning object, the cobbler server 102 can configure the target machine 205 and the resources of the target machine 205 according to the configurations contained in the associated management class.

In embodiments, once a target machine 205 is provisioned, the cobbler server 102 can be configured to provide an indication 235 of the provisioning processes to the configuration management server 215. The indication 235 can be configured to include the identification of the target machine 205, the management class of the provisioned target machine 205, and the provisioning process performed (e.g. software provisioned). The configuration management system 215 can be configured to store the received indication 235 in the network record 230. As such, the configuration management system 215 can perform the configuration management services on the provisioned target machine 205.

In embodiments, the cobbler server 102 can be configured to support multiple numbers and types of configuration management systems. For example, the cobbler server 102 can be associated with a second configuration management system 240. The second configuration management system 240 can be configured to provide configuration management services for certain target machines, for example target machines 210, in the network 115. Additionally, the second configuration management system 240 can be configured to provide configuration management services to other networks such as network 245. The second configuration management system 240 can be coupled to a CMBD 242.

In embodiments, the second configuration management system 240 can be a different type of management system than the configuration management system 215. Accordingly, the second configuration management system 240 can support a different set of management classes 250, which can be configured in a different format than the set of management classes 225 and can be configured to include different configurations for the target machines, such as the target machine 210 in the network 115.

In embodiments, the cobbler server 102 can be configured to associate the set of management classes 250 with the provisioning objects, such as profiles, templates, and system records. For example, the cobbler server 102 can associate a particular management class from the set of management classes 250 with provisioning objects for provisioning to certain target machines, such as the target machine 210. When provisioning processes are performed on the target machine 210, the cobbler server 102 can be configured perform the provisioning processes according to the configuration in the associated management class for the configuration management system 240. Additionally, once the provisioning process is performed, the cobbler server 102 can provide an indication 255 to the second configuration management system 240, which can include the identification of the target machine 210, the management class of the target machine 210, and the provisioning process performed on the target machine 210. The second configuration management system 240 can be configured to store the indication 255 in a network record 260 for the second configuration management system 240. As such, the second configuration management system 240 can perform the configuration management services on the provisioned target machines 210.

In embodiments, the cobbler server 102 can be configured to select the particular management classes to be associated with the provisioning objects. Additionally, the cobbler server 102 can be configured to generate the set of management classes 225 and/or 250 and determine the configuration contained in each management class in the set of management classes 225 and/or 250. As such, the cobbler server 102 can be configured to provide the set of management classes 225 and 250 to the configuration management system 215 and 240, respectively. Accordingly, the cobbler server 102 can control how the target machine 115 will be managed by the configuration management systems.

In embodiments, the configuration management systems 215 and 240 can be configured to generate the set of management classes 225 and 250, respectively. As such, the configuration management systems 215 and 240 can be configured to provide the set of management classes 225 and 250, respectively, to the cobbler server 102. Whether generated or received, the cobbler server 102 can be configured to store a copy of the set of management classes 225 and 250 in the provisioning database 120.

As illustrated in FIG. 2, the cobbler server 102 can be configured to operate in conjunction with two configuration management servers of different types. One skilled in the art will realize that the cobbler server 102 can operate in conjunction with any number or type of configuration management system as described above. Likewise, FIG. 2 illustrates the configuration management systems 215 and 240 as being separate from the cobbler server 102. One skilled in the art will realize that the cobbler server 102 can be configured to include the configuration management systems 215 and 240 as part of the cobbler server 102. As such, the cobbler server 102 can be configured to manage the configuration management services prior to, during, and after provisioning processes.

Figure 3:
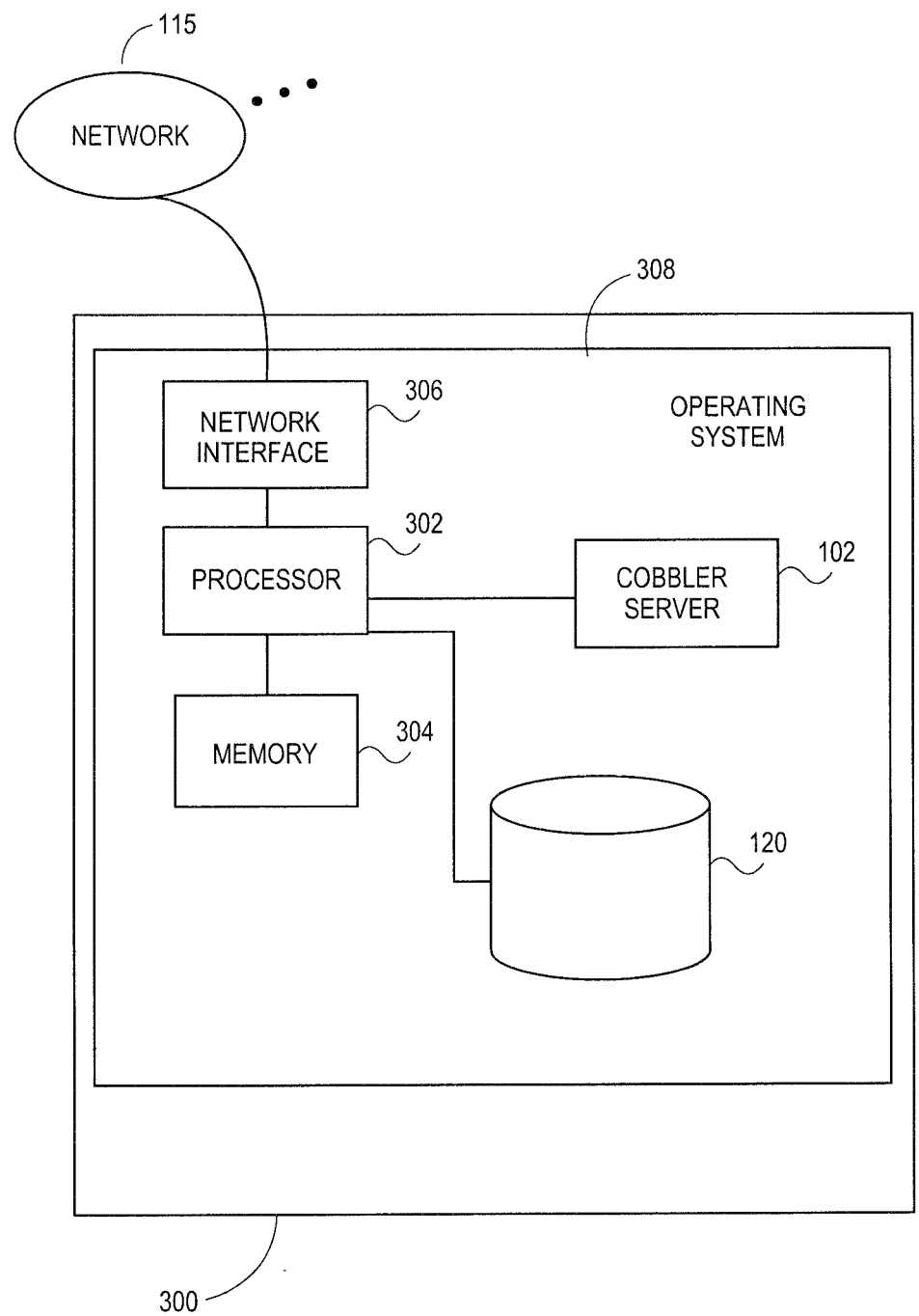
FIG. 3 illustrates an exemplary hardware configuration for a provisioning server, according to various embodiments.

FIG. 3 illustrates an exemplary diagram of hardware and other resources that can be incorporated in a computing system 300 configured to communicate with the network 115, and execute the cobbler server 102 according to embodiments. In embodiments as shown, the computing system 300 can comprise a processor 302 communicating with memory 304, such as electronic random access memory, operating under control of or in conjunction with operating system 308. Operating system 308 can be, for example, a distribution of the Linux™ operating system, the Unix™ operating system, or other open-source or proprietary operating system or platform. Processor 302 also communicates with the provisioning database 120, such as a database stored on a local hard drive. While illustrated as a local database in computing system 300, the provisioning database 120 can be separate from the computing system 300 and the cobbler server 102 can be configured to communicate with the remote provisioning database 120.

Processor 302 further communicates with network interface 306, such as an Ethernet or wireless data connection, which in turn communicates with one or more networks 115, such as the Internet or other public or private networks. Processor 302 also communicates with the provisioning database 120, and the cobbler server 102, to execute control logic and perform the provisioning processes and cooperate with configuration management systems 215 and 240, described above and below.

As illustrated, the cobbler server 102 can be implemented as a software application or program capable of being executed by a conventional computer platform. Likewise, the cobbler server 102 can also be implemented as a software module or program module capable of being incorporated in other software applications and programs. In either case, the cobbler server 102 can be implemented in any type of conventional proprietary or open-source computer language.

Additionally, the configuration management systems 215 and 240 can be implemented as a software application or program capable of being executed by a conventional computer platform. Likewise, the configuration management systems 215 and 240 can also be implemented as a software module or program module capable of being incorporated in other software applications and programs, such as the cobbler server 102. In either case, the configuration management systems 215 and 240 can be implemented in any type of conventional proprietary or open-source computer language.

Figure 4:
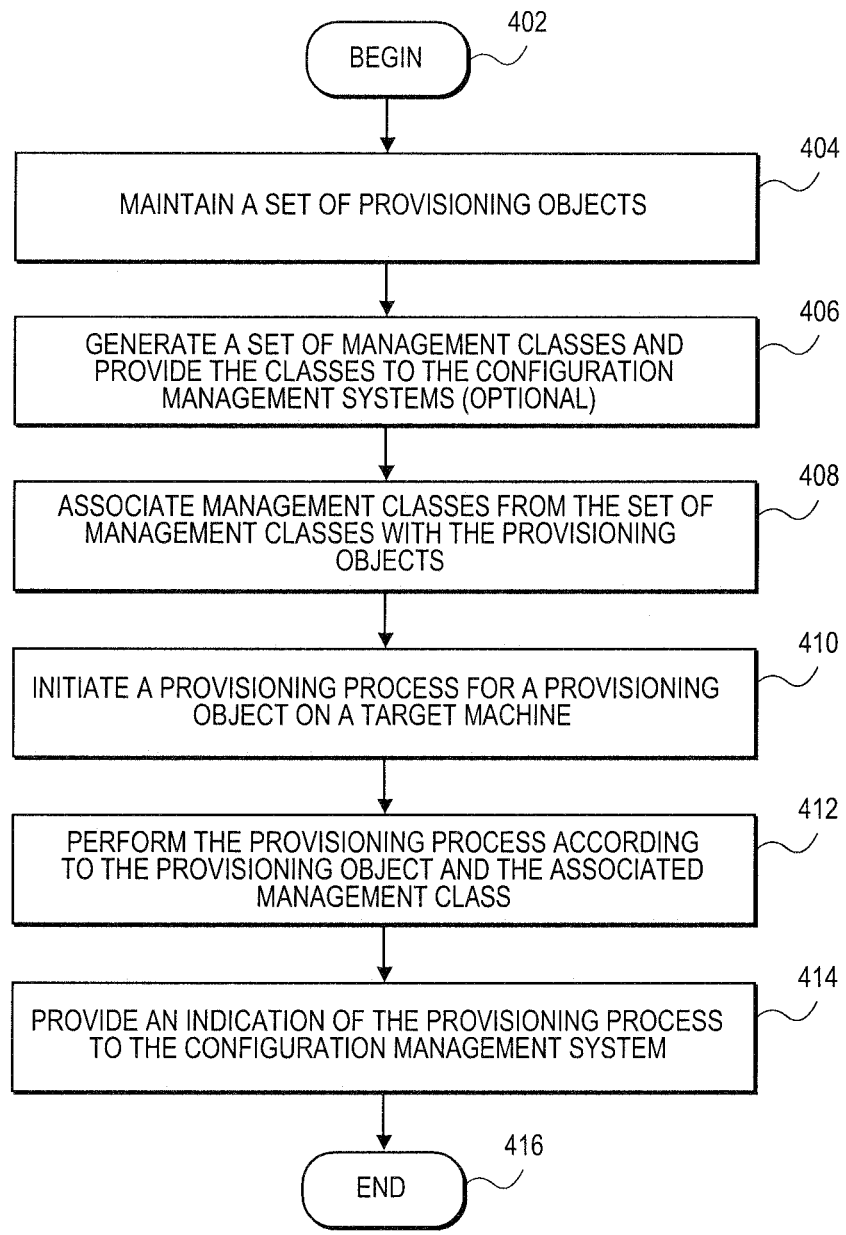
FIG. 4 illustrates a flowchart for integrating provisioning processes and configuration management, according to various embodiments.

FIG. 4 illustrates a flow diagram for integrating provisioning processes and configuration management in the provisioning environment 100, according to embodiments of the present teachings. In 402, the process can begin. In 404, the cobbler server 102 can maintain a set of provisioning objects. The provisioning objects can include all the data required by a cobbler server 102 to perform the software provisioning processes. The cobbler server 102, for example, can be configured to maintain the provisioning objects in the provisioning database 120.

In 406, the cobbler server 102 can optionally generate a set of management classes and provide the classes to the configuration management systems. For example, the cobbler server 102 can be configured to generate the set of management classes 225 and/or 250 and determine the configuration contained in each management class in the set of management classes 225 and/or 250. The cobbler server 102 can be configured to provide the set of management classes 225 and 250 to the configuration management system 215 and 240, respectively. Accordingly, the cobbler server 102 can control how the target machine 115 will be managed by the configuration management systems. Alternatively, the configuration management systems 215 and 240 can be configured to generate the set of management classes 225 and 250, respectively. As such, the configuration management systems 215 and 240 can be configured to provide the set of management classes 225 and 250, respectively, to the cobbler server 102. Whether generated or received, the cobbler server 102 can be configured to store a copy of the set of management classes 225 and 250 in the provisioning database 120.

In 408, the cobbler server 102 can associate management classes from the set of management classes with the provisioning objects. For example, the cobbler server 102 can associate the profiles, templates, system records, etc. with different management classes in the set of management classes 225.

In 410, the cobbler server 102 can initiate a provisioning process for a provisioning object on a target machine. The cobbler server 102 can be configured to initiate the provisioning process upon the occurrence of any event, such as a request to perform the provisioning process, addition of a new target machine, change in resources of the target machine, and the like. The cobbler server 102 can perform any type of provisioning processes that can be associated with a provisioning object, for example, provisioning a software distribution to a target machine 205 according to a profile.

In 412, the cobbler server 102 can perform the provisioning process according to the provisioning object and the associated management class. For example, if the cobbler server 102 performs provisioning a software distribution to a target machine 205 according to a profile, the cobbler server 102 can install the software distribution according to the profile and can configure the target machine 205, the software distribution, and the resources of the target machine 205 according to the configurations contained in the management class associated with profile.

In 414, the cobbler server 102 can provide an indication of the provisioning process to the configuration management system. For example, if the cobbler server 102 performs a provisioning processes on the target machine 205, the indication 235 can include the identification of the target machine 205, the management class of the provisioned target machine 205, and the provisioning process performed (e.g. software provisioned). The configuration management system 215 can be configured to store the received indication 235 in the network record 230.

In 416, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
    initiating, by a hardware processor of a provisioning server, a first provisioning process on a first target machine utilizing a first provisioning object and a second provisioning process on a second target machine utilizing a second provisioning object, wherein the first provisioning object comprises an identification of first software to be installed on the first target machine and the second provisioning object comprises an identification of second software to be installed on the second target machine, wherein the first provisioning process comprises one or more of installation, reinstallation, or virtualization of the first software at the first target machine by communicating with a helper client in operation at the first target machine and the second provisioning process comprises one or more of installation, reinstallation, or virtualization of the second software at the second target machine by communicating with the helper client in operation at the second target machine, and wherein the helper client enables replacement of running systems and installation of virtualized profiles;
    hosting, by the provisioning server, one or more exception plugins that further customize the first provisioning process of the first software at the first target machine or the second provisioning process of the second software at the second target machine;
    linking to or mirroring, by the provisioning server, a provisioning database comprising a distribution tree list, wherein the distribution tree list comprises an inventory of software that is hosted or mirrored by the provisioning server, and wherein the inventory of software identifies the first software and the second software;
    providing, by the provisioning server, an identification of the first target machine and an identification of a first management class to a first configuration management system that is separate from the provisioning server, wherein the first configuration management system is a first type of configuration management system and performs configuration management services for a first plurality of target machines other than installation, reinstallation, and virtualization, wherein the first type indicates that the first management class has a first format, wherein the first plurality of target machines comprises the first target machine, and wherein the first configuration management system performs configuration management services for the first software at the first target machine according to the first management class; and
    providing, by the provisioning server, an identification of the second target machine and an identification of a second management class to a second configuration management system that is separate from the provisioning server, wherein the second configuration management system is a second type of configuration management system that is different than the first type and performs configuration management services for a second plurality of target machines other than installation, reinstallation, and virtualization, wherein the second type indicates that the second management class has a second format that is different than the first format, wherein the second plurality of target machines comprises the second target machine, and wherein the second configuration management system performs configuration management services for the second software at the second target machine according to the second management class.

2. The method of claim 1, wherein the first management class comprises a configuration for resources of the first target machine and the second management class comprises a configuration for resources of the second target machine.

3. The method of claim 1, wherein the first provisioning object comprises at least one of a profile for the first provisioning process, a template for the first provisioning process, a software distribution record for the first provisioning process, or a record for the first target machine, and wherein the second provisioning object comprises at least one of a profile for the second provisioning process, a template for the second provisioning process, a software distribution record for the second provisioning process, or a record for the second target machine.

4. The method of claim 1, further comprising:
    generating a set of management classes for the first configuration management system and the second configuration management system, wherein the set of management classes comprises the first management class and the second management class; and
    storing the set of management classes.

5. The method of claim 1, further comprising:
    associating, by the provisioning server, the first management class with the first provisioning object and the second management class with the second provisioning object.

6. A system comprising:
    a network interface at a provisioning server to a first target machine and a second target machine; and
    a hardware processor at the provisioning server to communicate with the network interface, a first configuration management system, and a second configuration management system, the hardware processor to:
        initiate a first provisioning process on the first target machine utilizing a first provisioning object and a second provisioning process on the second target machine utilizing a second provisioning object, wherein the first provisioning object comprises an identification of first software to be installed on the first target machine and the second provisioning object comprises an identification of second software to be installed on the second target machine, wherein the first provisioning process comprises one or more of installation, reinstallation, or virtualization of the first software at the first target machine by communicating with a helper client in operation at the first target machine and the second provisioning process comprises one or more of installation, reinstallation, or virtualization of the second software at the second target machine by communicating with the helper client in operation at the second target machine, and wherein the helper client enables replacement of running systems and installation of virtualized profiles;
        host one or more exception plugins that further customize the first provisioning process of the first software at the first target machine or the second provisioning process of the second software at the second target machine;

link to or mirror a provisioning database comprising a distribution tree list, wherein the distribution tree list comprises an inventory of software that is hosted or mirrored by the provisioning server, and wherein the inventory of software identifies the first software and the second software;

provide an identification of the first target machine and an identification of a first management class to the first configuration management system that is separate from the provisioning server, wherein the first configuration management system is a first type of configuration management system and performs configuration management services for a first plurality of target machines other than installation, reinstallation, and virtualization, wherein the first type indicates that the first management class has a first format, wherein the first plurality of target machines comprises the first target machine, and wherein the first configuration management system performs configuration management services for the first software at the first target machine according to the first management class; and provide an identification of the second target machine and an identification of a second management class to the second configuration management system that is separate from the provisioning server, wherein the second configuration management system is a second type of configuration management system that is different than the first type and performs configuration management services for a second plurality of target machines other than installation, reinstallation, and virtualization, wherein the second type indicates that the second management class has a second format that is different than the first format, wherein the second plurality of target machines comprises the second target machine, and wherein the second configuration management system performs configuration management services for the second software at the second target machine according to the second management class.

7. The system of claim 6, wherein the first management class comprises a configuration for resources of the first target machine and the second management class comprises a configuration for resources of the second target machine.

8. The system of claim 6, wherein the first provisioning object comprises at least one of a profile for the first provisioning process, a template for the first provisioning process, a software distribution record for the first provisioning process, or a record for the first target machine, and wherein the second provisioning object comprises at least one of a profile for the second provisioning process, a template for the second provisioning process, a software distribution record for the second provisioning process, or a record for the second target machine.

9. The system of claim 6, wherein the hardware processor is further to:

generate a set of management classes for the first configuration management system and the second configuration management system, wherein the set of management classes comprises the first management class and the second management class; and store the set of management classes.

10. The system of claim 6, wherein the hardware processor is further to:

associate the first management class with the first provisioning object and the second management class with the second provisioning object.

11. A non-transitory computer readable storage medium having instructions stored therein that, when executed by a hardware processor, cause the hardware processor to:

initiate, by the hardware processor of a provisioning server, a first provisioning process on a first target machine utilizing a first provisioning object and a second provisioning process on a second target machine utilizing a second provisioning object, wherein the first provisioning object comprises an identification of first software to be installed on the first target machine and the second provisioning object comprises an identification of second software to be installed on the second target machine, wherein the first provisioning process comprises one or more of installation, reinstallation, or virtualization of the first software at the first target machine by communicating with a helper client in operation at the first target machine and the second provisioning process comprises one or more of installation, reinstallation, or virtualization of the second software at the second target machine by communicating with the helper client in operation at the second target machine, and wherein the helper client enables replacement of running systems and installation of virtualized profiles;

host, by the provisioning server, one or more exception plugins that further customize the first provisioning process of the first software at the first target machine or the second provisioning process of the second software at the second target machine;

link to or mirror, by the provisioning server, a provisioning database comprising a distribution tree list, wherein the distribution tree list comprises an inventory of software that is hosted or mirrored by the provisioning server, and wherein the inventory of software identifies the first software and the second software;

provide, by the provisioning server, an identification of the first target machine and an identification of a first management class to a first configuration management system that is separate from the provisioning server, wherein the first configuration management system is a first type of configuration management system and performs configuration management services for a first plurality of target machines other than installation, reinstallation, and virtualization, wherein the first type indicates that the first management class has a first format, wherein the first plurality of target machines comprises the first target machine, and wherein the first configuration management system performs configuration management services for the first software at the first target machine according to the first management class; and provide, by the provisioning server, an identification of the second target machine and an identification of a second management class to a second configuration management system that is separate from the provisioning server, wherein the second configuration management system is a second type of configuration management system that is different than the first type and performs configuration management services for a second plurality of target machines other than installation, reinstallation, and virtualization, wherein the second type indicates that the second management class has a second format that is different than the first format, wherein the second plurality of target machines comprises the second target machine, and wherein the second configuration management system performs configuration management services for the second software at the second target machine according to the second management class.

12. The non-transitory computer readable storage medium of claim 11, wherein the first management class comprises a configuration for resources of the first target machine and the second management class comprises a configuration for resources of the second target machine.

13. The non-transitory computer readable storage medium of claim 11, wherein the first provisioning object comprises at least one of a profile for the first provisioning process, a template for the first provisioning process, a software distribution record for the first provisioning process, or a record for the first target machine, and wherein the second provisioning object comprises at least one of a profile for the second provisioning process, a template for the second provisioning process, a software distribution record for the second provisioning process, or a record for the second target machine.

14. The non-transitory computer readable storage medium of claim 11, wherein the hardware processor is further to:
   generate a set of management classes for the first configuration management system and the second configuration management system, wherein the set of management classes comprises the first management class and the second management class; and
   store the set of management classes.

15. The non-transitory computer readable storage medium of claim 11, wherein the hardware processor is further to:
   associate, by the provisioning server, the first management class with the first provisioning object and the second management class with the second provisioning object.

* * * * *